June 23, 1936.  E. E. HEWITT  2,045,185
FLUID PRESSURE BRAKE
Filed Oct. 27, 1932  3 Sheets—Sheet 3
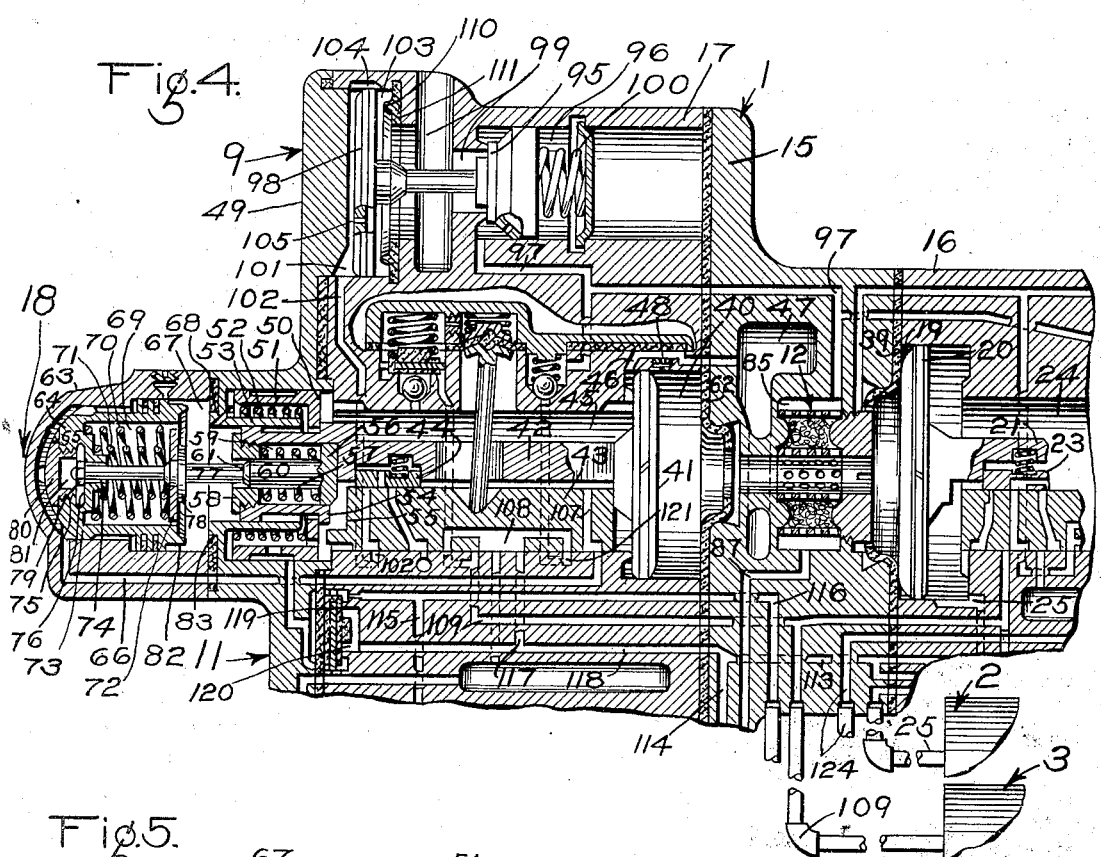
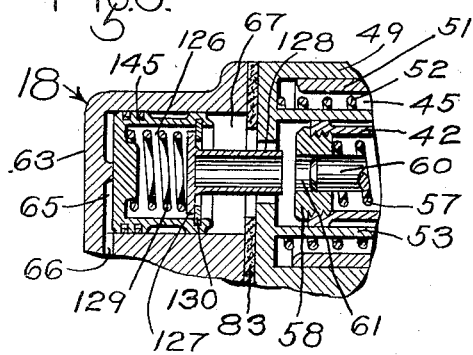
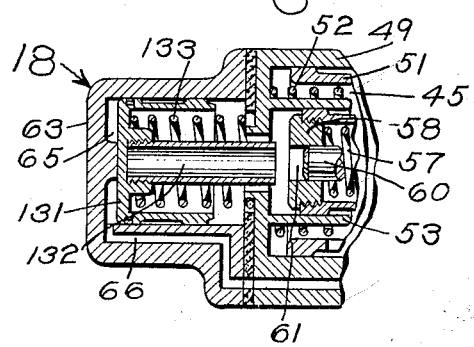
INVENTOR
ELLIS E. HEWITT
BY Wm. M. Cady
ATTORNEY Patented June 23, 1936

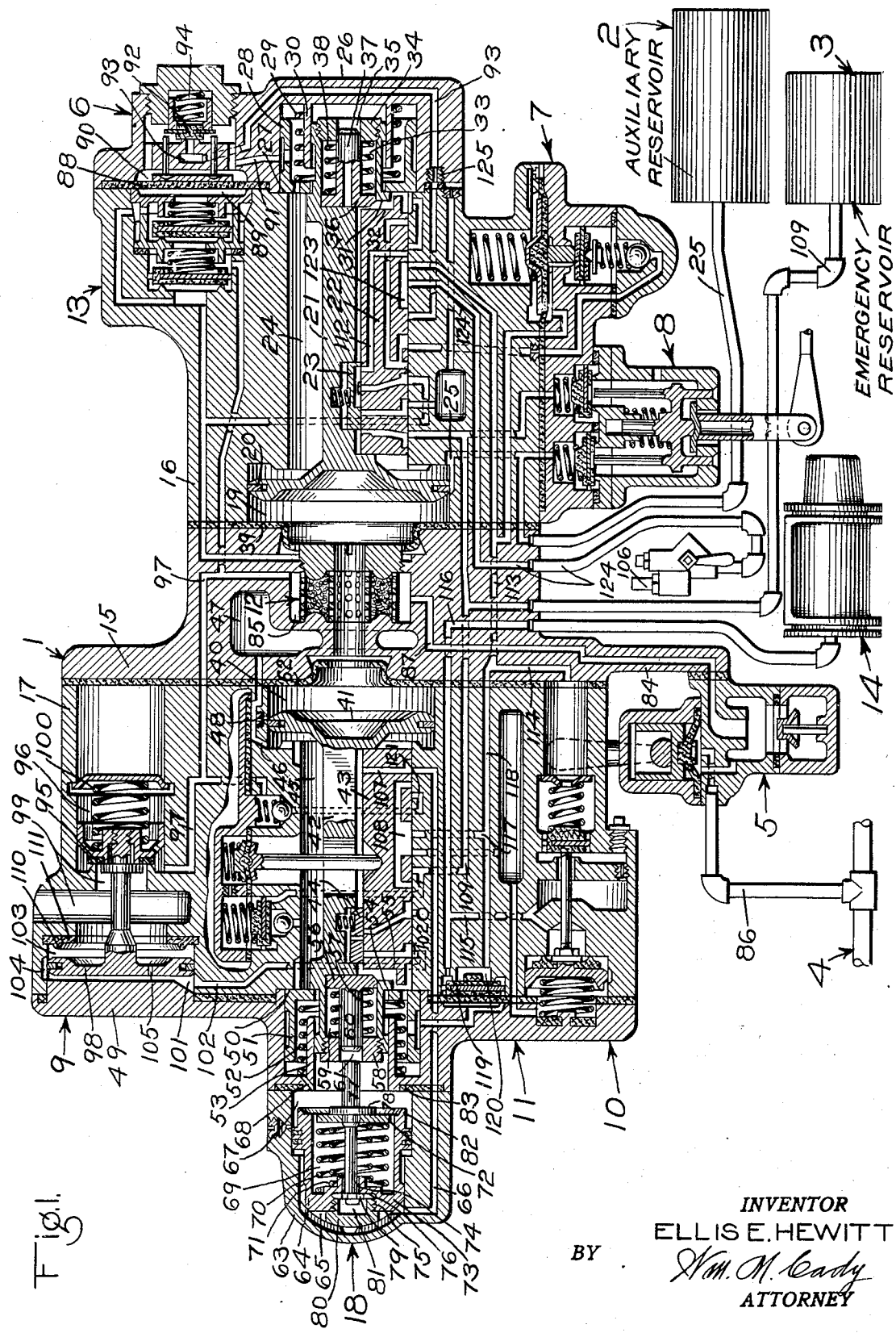

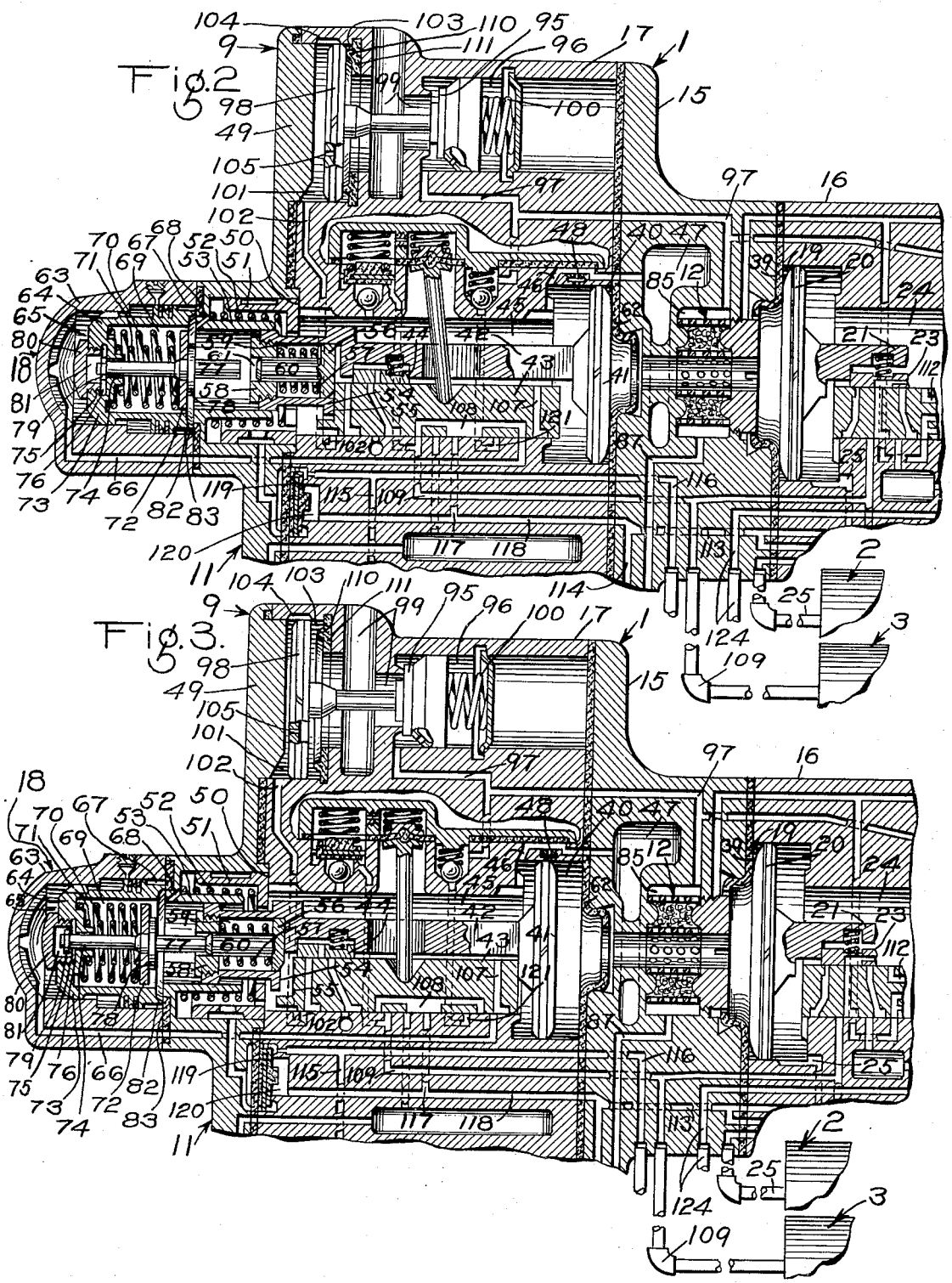

2,045,185

UNITED STATES PATENT OFFICE 2,045,185

FLUID PRESSURE BRAKE

Ellis E. Hewitt, Edgewood, Pa., assignor to The Westinghouse Air Brake Company, Wilmerding, Pa., a corporation of Pennsylvania Application October 27, 1932, Serial No. 639,797

45 Claims. (Cl. 303—41)

This invention relates to fluid pressure brake equipment for controlling the application and release of the brakes on cars of a railway train and more particularly to that type of equipment which is fully disclosed in an application of Clyde C. Farmer, filed May 20, 1932, Serial No. 612,465.

The present standard fluid pressure brake equipment for railway cars was designed for handling trains of a length up to eighty cars. In recent years, however, trains of more than eighty cars have frequently been operated on various railroads.

As a consequence of the increased length of trains, it has become increasingly difficult to so control the brakes as to secure the prompt and reliable application and release of the brakes on all of the cars of the train. The fluid pressure brake equipment disclosed in the aforementioned Farmer application has been designed to, and does operate to overcome the difficulties encountered in long train operation where each car is equipped with this type of apparatus.

If a brake equipment embodying the features of the aforementioned Farmer application should be adopted by the railroads as standard, it is evident that owing to the large number of cars now equipped with the old standard brake equipment, there will be a transition period of some time in which trains will comprise cars equipped with the old apparatus and cars equipped with the new apparatus. It is obvious that in making up trains during the transition period, innumerable combinations of the old and new equipments will be formed.

Owing to the difficult release characteristics of the old standard brake equipment as compared with those of the improved brake equipment, I have found that there are possible combinations of old and improved brake equipments which will render it difficult to release the brakes after an emergency application of the brakes, such as where the rear cars are equipped with the new apparatus, due to the fact that the old standard equipment will function in releasing the brakes to materially retard the rate at which the brake pipe pressure is increased toward the rear of the train.

To make this point clear I will consider one unfavorable combination wherein the first fifty cars of a train of one hundred fifty cars are each equipped with the new fluid pressure brake equipment disclosed in the aforementioned Farmer application, each of the next fifty cars with the present standard fluid pressure brake equipment in which the K type of triple valve device is employed, and each of the last fifty cars with the new equipment.

In effecting an emergency application of the brakes on a train having the above disposition of equipments, the pressures of the auxiliary and emergency reservoirs and brake cylinders on the first and last fifty cars may equalize at approximately sixty pounds, and the pressures of the auxiliary reservoirs and brake cylinders on the remaining or middle fifty cars will equalize at approximately fifty-three pounds, the higher equalized pressure on the first and last fifty cars being due to the addition of the emergency reservoir volume to that of the auxiliary reservoirs and brake cylinders.

In releasing an emergency application of the brakes, fluid under pressure is supplied to the brake pipe in the usual manner. At the front end of the train, the increase in brake pipe pressure will, as is well known, be at a rapid rate. This rapid increase in brake pipe pressure causes a sufficient differential to be created on the emergency pistons of the equipments on the first fifty cars to effect their prompt movement to inner release or back-dump position. In this position, the emergency main slide valves, which have been shifted to their back-dump position by the emergency pistons, establish communications through which fluid under pressure flows from the brake cylinders and auxiliary reservoirs to the brake pipe. As a consequence, the rate of increase in brake pipe pressure on the first fifty cars is accelerated and the brake cylinder and auxiliary reservoir pressures are reduced to around forty-five pounds.

Due to the great length and volume of the brake pipe on the middle fifty cars equipped with the present standard equipment, and to the frictional resistance offered by the brake pipe to the flow of fluid, the rate of recharge of the brake pipe will be gradually retarded toward the rear end of the train. The extent of this retardation may be such that, on the last fifty cars of the train, the increase in brake pipe pressure will be so slow, that when the emergency pistons and emergency slide valves are returned to their normal release position, the rate of flow of fluid from the emergency piston chambers to the emergency valve chambers and connected quick action chambers will be such as to prevent a sufficient pressure differential from being created on the emergency pistons to cause the pistons and emergency slide valves to move to their inner release or back-dump position against the opposing pressure of the spring means which cooperate with the piston stems to define the normal release position of the pistons and slide valves. As a result of this, the back-dump feature is, in effect, entirely eliminated on the last fifty cars of the train.

When the brake pipe pressure on the first fifty cars has been increased to around forty-six or forty-seven pounds, the triple valve devices on these cars will be caused to move to release position, in which fluid under pressure is supplied from the brake pipe to both the auxiliary and emergency reservoirs. This has the effect of further retarding the rate of increase in brake pipe pressure on the last one hundred cars of the train.

Now when the brake pipe pressure on the middle fifty cars equipped with the K type of triple valve devices, has been increased to above fifty-four pounds, the triple valve pistons on these cars are caused to operate to shift the triple valve slide valves to release position, in which fluid under pressure is supplied from the brake pipe to the auxiliary reservoirs. This recharge of the auxiliary reservoirs has the effect of still further retarding the rate of increase in brake pipe pressure on the last fifty cars of the train.

When the slowly increasing brake pipe pressure on the last fifty cars of the train and acting on one side of the triple valve pistons, approaches auxiliary reservoir pressure, acting on the other sides of these pistons, the stabilizing mechanisms, carried by the piston stems, act to move the pistons out of sealing engagement with the gaskets mounted in the triple valve casings. Now when the brake pipe pressure has been increased over auxiliary reservoir pressure, fluid may leak past the triple valve piston rings to the auxiliary reservoirs and, if the rate of increase in brake pipe pressure does not exceed the rate of such leakage, a sufficient fluid pressure differential cannot be created on the triple valve pistons to cause them to operate to shift the slide valves to release position. As a result of this, some or all of the brakes on the last fifty cars of the train may remain applied. This difficulty will not be overcome on the cars equipped with a release insuring valve device, since the device cannot operate to vent fluid from the auxiliary reservoir so long as the brake pipe and auxiliary reservoir pressures increase at substantially the same rate.

The principal object of my invention is to provide an improved fluid pressure brake equipment having operating characteristics for eliminating the aforementioned difficulty in releasing an emergency application of the brakes.

Another object of my invention is to provide a fluid pressure brake equipment, having an emergency valve device, with means which, when the release of an emergency application of the brakes is initiated, will oppose the movement of the emergency valve mechanism toward a release position until a predetermined brake pipe pressure is obtained, and which will then be rendered ineffective to oppose such movement.

Another object of my invention is to provide means which, when associated with a fluid pressure brake emergency mechanism that is dependent upon the rate of increase in brake pipe pressure for operation to its innermost release or back-dump position in effecting the release of an emergency application of the brakes, will so modify the operating characteristics of the mechanism, in releasing the brakes after an emergency application, that it will be dependent upon the amount of increase in brake pipe pressure instead of upon the rate of increase; in other words, I provide means which will operate only when the brake pipe pressure has been increased to a predetermined degree, and thus will not depend for operation upon the rate at which the brake pipe pressure is increased.

Other objects and advantages of my invention will appear in the following more detailed description of the fluid pressure brake equipment.

In the accompanying drawings: Fig. 1 is a diagrammatic view, mainly in section, of a fluid pressure brake equipment embodying my invention, the various parts of the equipment being shown in normal release position; Fig. 2 is a similar view of a portion of the equipment in which the various parts are shown in emergency application position; Fig. 3 is a view similar to Fig. 2 but showing the various parts in a position they assume in releasing an emergency application of the brakes; Fig. 4 is a view similar to Fig. 2 but showing the various parts of the equipment in the innermost release or back-dump position; Fig. 5 is a fragmentary sectional view of a slight modification of a portion of the invention; Fig. 6 is a fragmentary sectional view of another slight modification of a portion of the invention; and Fig. 7 is a fragmentary sectional view of a further slight modification of a portion of the invention.

As shown in the accompanying drawings, the fluid pressure brake equipment may be of the type disclosed in the aforementioned Farmer application which equipment comprises a brake controlling valve device 1, an auxiliary reservoir 2, an emergency reservoir 3, a brake pipe 4, a combined cut-out cock and centrifugal dirt collector 5, a release insuring valve device 6, a quick service modifying or limiting valve device 7, a reservoir release valve device 8, a quick action valve device 9, an emergency inshot valve device 10, a timing valve device 11, a strainer device 12, a double check valve device 13 and a brake cylinder 14.

The brake controlling valve device 1 may comprise a pipe bracket 15, to which the casings of a triple valve device 16 and an emergency valve device 17 are clamped.

The equipment also comprises a stop device 18 which is associated with the emergency valve device 17. The stop device is adapted to cooperate with the emergency valve device in such a manner, in releasing an emergency application of the brakes, as to insure the movement of the emergency valve device to a position for supplying fluid under pressure from the brake cylinder to the brake pipe on the cars of a train when the increase in brake pipe pressure is at a slow rate. This feature will be hereinafter more fully described.

With the exception of the emergency valve device 17 and stop device 18, the various parts and devices of the equipment are of substantially the same construction and function in substantially the same manner, in controlling the application and release of the brakes, as the corresponding parts and devices of the equipment disclosed in the aforementioned Farmer application. Due to this and for the purpose of simplifying this specification, a detailed description of various functions and details of construction of the equipment will be omitted.

The triple valve device may comprise a casing having a chamber 19 containing a piston 20 provided with a stem 21 adapted to operate a main slide valve 22 and an auxiliary slide valve 23 contained in a valve chamber 24 which is connected, through a pipe and passage 25, to the auxiliary reservoir 2.

The valve chamber 24 is closed at one end by a cap 26 which has a recess formed therein and which defines the rear end portion of the valve chamber. This recess is of greater diameter than that of the major portion of the valve chamber and due to this, the rear end of the triple valve casing forms a stop shoulder 27 against which a stop member 28, slidably mounted in the cap 26, is adapted to abut to limit inward movement of the member 28. Interposed between and engaging the stop member 28, is a spring 29 which, at all times, tends to move the member 28 toward the shoulder 27.

The rear end portion of the piston stem 21 extends through a central opening in the stop member 28 and is slidably guided in an annular lug 30 carried by the cap 26. The piston stem, at a point located a short distance inwardly from its rear end, is provided with an operating collar or lug 31, one side of which is adapted to be engaged by the stop member 28 and the other side of which is adapted to operatively engage a rear end surface 32 of the main slide valve 22.

The rear end portion of the stem 21 is provided with a bore 33 which is closed at one end by a plug 34 having screw-threaded connection with the stem, said plug being provided with a central bore 35. Below the lower surface of the major portion of the stem, the other end of the bore 33 is open. The inner end wall of the bore 33 forms a stop shoulder adapted to be engaged by a plunger 36 which is in slidable engagement with the stem within the bore 33. This plunger is provided with a stem 37 which is slidably guided by the plug 34 within the bore 35.

Interposed between and engaging one side of the plunger 36 and plug 34 is a spring 38 which acts to normally maintain the plunger in engagement with the end wall of the bore 33. In this position, the face of the plunger will be closer to the rear face 32 of the main slide valve 22 than will be the outer face of the collar 31 of the piston stem, so that in effecting an application of the brakes, the plunger will engage the main slide valve and yieldably resist movement of the piston and auxiliary slide valve 23 relative to the main slide valve before the collar 31 engages the main slide valve. The purpose of this, as fully described in the aforementioned Farmer application, is to stabilize the action of the triple valve parts. This stabilizing mechanism also acts to assist in breaking the seal between the triple valve piston 20 and a sealing gasket 39, clamped between the pipe bracket 15 and the casing of the triple valve device, in effecting a release of the brakes and further serves as a graduating spring for shifting the piston to service lap position.

The emergency valve device comprises a casing having a piston chamber 40 containing an emergency piston 41 provided with a stem 42 adapted to operate a main slide valve 43 and an auxiliary slide valve 44 contained in a valve chamber 45 which is connected, through a passage 46, with a quick action chamber 47 formed in the pipe bracket 15. The piston chamber 40 is normally open, through a choke plug 48, to the passage 46.

A cap 49 is secured to the rear end of the casing of the emergency valve device and has an annular recess formed therein which constitutes a portion of the emergency valve chamber 45. This recess is of greater diameter than that of the major portion of the valve chamber and, due to this, the rear end of the casing forms a stop shoulder 50 against which a stop member 51, slidably mounted in the cap 49, is adapted to abut, and thus the inward movement of the member 51 is limited. Interposed between and engaging the cap 49 and member 51 is a spring 52 which, at all times, tends to move the member 51 toward the stop shoulder 50.

The rear end portion of the emergency piston stem 42 extends through a central opening in the member 51 and is slidably guided in an annular lug 53 carried by the cap 49.

The stem 42, at a point located a short distance inwardly from its rear end, is provided with an operating collar or lug 54, one side of which is adapted to be operatively engaged by the member 51 and the other side of which is adapted to operatively engage a rear end surface 55 of the main slide valve 43.

The rear end portion of the emergency piston stem carries a mechanism which, in construction, is quite similar to the stabilizing mechanism carried by the rear end of the triple valve piston stem 21, and comprises a plunger 56 which is subject to the pressure of a spring 57 interposed between and engaging the plunger and a plug 58 having a screw-threaded connection with the stem 42. The plunger is slidably guided within a bore 59 provided in the piston stem, and has a stem 60 which is slidable within a bore 61 provided in the plug 58. This mechanism is adapted to cooperate with the main slide valve 43 to assist in shifting the emergency piston 41 out of sealing engagement with a gasket 62 in releasing the brakes after an emergency application.

In the present embodiment of my invention, the annular lug 53 defines an opening through the cap 49.

The stop device 18, as will hereinafter more fully appear, is for the purpose of insuring the movement of the emergency piston and slide valves to their inner or back-dump position in releasing an emergency application of the brakes and is rendered effective only when an emergency application is being effected.

This stop member 18 is arranged at the rear of the emergency valve device in longitudinal alignment with the emergency piston and stem, and may comprise a casing 63 which is secured to the cap 49 of the emergency valve device and which contains a piston 64.

At the rear end of the piston 64 there is a chamber 65 which is constantly open to a passage 66 leading to the seat of the emergency main slide valve 43, and at its forward end there is a chamber 67 which is in constant communication through a passage 68 with the emergency valve chamber 45.

The piston 64 is provided with a recess 69 which is open at the forward end of the piston and contains coil springs 70 and 71 and a follower plate 72 which is in operative engagement with the forward ends of the springs and which is movable back and forth relative to the piston.

The end wall 73 of the piston is provided with a central bore 74 and a counter-bore 75 so as to provide a stop shoulder 76. Slidably guided within the bore 74 is a plunger 77 which extends through and beyond the follower plate 72 and which terminates adjacent the rear end of the piston stem 42. The outer end of the plunger is adapted to be operatively engaged by the end of the plunger stem 60 carried by the emergency piston stem 42. A collar 78 is rigidly carried by the plunger 77, which collar is in operative engagement with the outer surface of the follower plate 72.

The rear end of the plunger 77 extends beyond the stop shoulder 76 of the rear wall of the piston and is provided with a key 79 which is adapted to engage the shoulder 76 to limit forward movement of the plunger and follower plate relative to the piston. The rear end of the plunger 77 is covered by a nut 80 having screw-threaded connection with the end wall of the piston within the counter-bore 75, the threaded portion of the nut being provided with a central bore 81 of sufficient depth and diameter so as to permit free movement of the plunger and key 79 relative to the piston. This nut prevents leakage of fluid past the piston by way of any clearance space between the plunger 77 and the end wall of the piston.

The forward end of the piston 64 is provided with an annular rib 82 which is adapted to engage a gasket 83, clamped between the casing 63 and the cap 49, to prevent fluid, which may leak past the rings of the piston, from entering the valve chamber 45.

The pipe bracket 15 is provided with an extension 84 to which is secured the casing of the combined centrifugal dirt collector and cut-out cock device 5.

Formed in the pipe bracket are a plurality of fluid conducting passages which are open to the several clamping faces of the bracket where they are adapted to register with corresponding passages formed in the casings of the triple valve device 16, emergency valve device 17 and device 5. There is also formed in the pipe bracket a chamber 85 which contains the strainer device 12.

The brake pipe 4 is normally open to the strainer chamber 85 through a pipe 86, device 5 and a passage 87. Normally the chamber 85 is in communication with both the triple valve piston chamber 19 and the emergency piston chamber 40 through the straining material of the strainer. If the strainer should become clogged, the double check valve device 13, which is mounted in the triple valve casing, will by-pass fluid around the strainer device in the same manner as fully described in the aforementioned Farmer application.

The release insuring valve device 6 is for the purpose of venting fluid under pressure from the auxiliary reservoir 2 when, in releasing the brakes, brake pipe pressure is increased to a predetermined degree in excess of auxiliary reservoir pressure, so as to facilitate the movement of the triple valve piston 20 to release position. Briefly described, this device comprises a flexible diaphragm 88, at one side of which there is a chamber 89 open, by way of the double check valve device 13, to the chamber 85 and consequently to the brake pipe and at the other side of which there is a chamber 90 open through a passage 91 to the valve chamber 24 of the triple valve device. Contained in the chamber 90 is a valve 92 which is operative to control communication from the chamber 90 to a vent passage 93 leading to the seat of the main slide valve 22 of the triple valve device, said valve being normally maintained closed by a spring 94. The flexible diaphragm is subjected, as will be understood, to the opposing pressures of the brake pipe and auxiliary reservoir and is operable to control the operation of the valve 92.

The quick action valve device 9 is associated with the emergency valve device 17 and is mounted on the emergency valve casing. Briefly described, this device 9 comprises a quick action valve 95 which is contained in a chamber 96 constantly connected, through a passage 97, to the chamber 85 and also comprises a piston 98 adapted to control the operation of the valve 95 to open and close a communication 99 from the chamber 96 to the atmosphere, said valve being normally maintained closed by the action of a coil spring 100. At one side of the piston 98 there is a chamber 101 which is constantly open to a passage 102 leading to the seat of the emergency main slide valve 43. At the other side of the piston there is a chamber 103 which is open to the atmosphere by way of the communication 99.

With the quick action piston in its normal position as shown in the drawings, the piston chamber 101 is open to the atmosphere by way of a leakage groove 104 around the piston and also by way of a small port 105 in the piston. The purpose of the small port is to control the rate of flow of fluid from the emergency valve chamber and the connected quick action chamber 47 to the atmosphere so as to insure the vent valve 95 remaining open for a predetermined period of time. The leakage groove 104 provides for the fairly rapid discharge of fluid from the piston chamber 101, so as to prevent the development of sufficient pressure in said chamber to cause the piston 98 to move to its valve unseating position in the event of the leakage of fluid to the chamber by way of passage 102.

The inshot valve mechanism 10 is contained in the casing of the emergency valve device 17 and functions in effecting an emergency application of the brakes to provide an initial inshot of fluid to the brake cylinder until a predetermined brake cylinder pressure is developed and then functions to restrict the rate of flow of fluid to the brake cylinder.

The timing valve device 11 is contained in the casing of the emergency valve device and operates, in effecting an emergency application of the brakes to supply a final inshot of fluid to the brake cylinder at a predetermined time after the valve device 10 operates to retard the flow of fluid to the brake cylinder.

The quick service modifying or limiting valve device 7 is carried by the casing of the triple valve device 16 and is for the purpose of limiting the local quick service reduction in brake pipe pressure according to a predetermined increase in brake cylinder pressure to insure the development of a predetermined but light brake cylinder pressure upon a light reduction in brake pipe pressure being effected through the medium of the usual brake valve device (not shown), so as to prevent the slack in the train from running in harshly.

The reservoir release valve device 8 is carried by the casing of the triple valve device 16 and is manually operative to vent fluid under pressure from the auxiliary reservoir 2 or from both the auxiliary reservoir and emergency reservoir 3 to effect the release of the brakes independently of the engineer's brake valve device under certain train operating conditions.

The equipment may further comprise a retaining valve device 106 which may be of the usual well known construction having a cut-out position in which fluid under pressure is adapted to be completely vented from the brake cylinder and also having a cut-in position in which it operates in the usual manner in releasing the brakes to retain a predetermined pressure in the brake cylinder.

The foregoing description has been limited more or less to the details of the various parts of the equipment and the following description will be directed more particularly to the functioning of said parts in controlling the brakes.

It will here be understood that, with the exception of releasing the brakes after an emergency application, the equipment functions to control the brakes in the same manner as the equipment which is fully described and broadly claimed in the aforementioned Farmer application, and in view of this, the following description will be limited to the operations of the equipment which differ from those described in the Farmer application.

With the equipment fully charged and the various parts thereof in normal release position, as shown in Fig. 1 of the drawings, the valve chamber 45 of the emergency valve device 17 is in communication, by way of passage 68, with the chamber 67 at one side of the piston 64 of the stop device 18, and with the piston chamber 65 at the other side of the piston 64, through a port 107 in the emergency main slide valve 43 and passage 66. Since both of these chambers of the device 18 are in communication with the valve chamber 45, the pressures on opposite sides of the piston 64 will be equal, so that the device 18 will exert no influence on the several parts of the emergency valve device.

To effect an emergency application of the brakes, a sudden reduction in brake pipe pressure is made which causes both the triple valve device 16 to move to application position and the emergency valve device 17 to move to emergency position.

With the triple valve device 16 and emergency valve device 17 in application position, fluid under pressure is supplied from both the auxiliary reservoir 2 and emergency reservoir 3 to the brake cylinder 14, the flow of fluid from the auxiliary reservoir being by way of pipe and passage 25, valve chamber 24 of the triple valve device, a service port 112 in the triple valve main slide valve, a passage 113, a branch passage 114, through the emergency inshot valve device 10, a passage 115 and a passage and pipe 116. The flow of fluid from the emergency reservoir 3 to the passage 114 and consequently to the brake cylinder is by way of a pipe and passage 109, a cavity 108 in the emergency main slide valve 43, and passages 117 and 118. When the valve 119 of the timing valve device 11 is moved to its open position by fluid at brake cylinder pressure, there is an additional flow of fluid from the auxiliary reservoir and emergency reservoir by way of passage 118, timing valve chamber 120 and passage and pipe 116.

When, in effecting an emergency application of the brakes, the emergency piston 41 and main slide valve 43 are being moved to emergency position, the port 107 in the main slide valve moves out of registration with the passage 66 and the cavity 108 in the slide valve moves into registration with and connects the passage 109, leading from the emergency reservoir, to the passage 66, so that fluid under pressure now flows from the emergency reservoir to the piston chamber 65 at one side of the piston 64. This communication between the emergency reservoir and the piston chamber 65 is maintained so long as the main slide valve remains in emergency position.

With the main slide valve 43 in emergency position, the passage 102 is uncovered so that fluid under pressure flows from the emergency valve chamber 45 and connected quick action chamber 47 to the quick action piston chamber 101 by way of passage 102 and causes the piston to operate to unseat the quick action vent valve 95 against the opposing pressure of the spring 100. As the piston nears its innermost position it engages the annular seat rib 110 of a sealing gasket 111. With the piston in this position, the pressure of fluid in the emergency valve chamber 45 and quick action chamber 47 and quick action piston chamber 101 is reduced by flow through the port 105, in the quick action piston, to the atmosphere.

As the pressure of fluid in the valve chamber 45 is being reduced, fluid at emergency reservoir pressure, in piston chamber 65, causes the piston 64, springs 70 and 71, follower plate 72 and plunger 77 to move forwardly, i. e., in a direction toward the end of the emergency piston stem 42, as a unit until brought to a stop by the annular rib 82 of the piston engaging the sealing gasket 83.

Upon the substantially complete venting of fluid at quick action chamber pressure, from the emergency valve chamber 54, the pressure of the compressed spring 57, acting through the medium of the emergency piston stem 42, causes the emergency piston 41 and thereby the auxiliary slide valve 44 to move relative to the main slide valve 43, but upon the engagement of the end of the plunger 56 and the piston stem, the spring 57 will no longer act to retract the piston and auxiliary slide valve, and as a result of this, the rearward movement of the piston and slide valve ceases before the piston engages the front end of the main slide valve 43 and before the rear end of the plunger stem 60 engages with the plunger 77 of the device 18. As a consequence the seal between the piston 41 and gasket 62 is broken and the main slide valve 43 remains in emergency application position.

*Release of the brakes after an emergency application*

To effect a release of the brakes after an emergency application, fluid under pressure is supplied to the brake pipe 4 in the usual manner and flows to the triple valve piston chamber 19 and to the emergency piston chamber 40. Fluid in the valve chamber 24 of the triple valve device 16 is at reduced auxiliary reservoir pressure and fluid in the valve chamber 45 of the emergency valve device 16 is at atmospheric pressure. Since the chamber 45 is at atmospheric pressure, the emergency piston will move rearwardly, i. e., in the direction toward the left hand, upon a slight increase in brake pipe pressure, bringing the rear end of the plunger stem 60 carried by the emergency piston stem 42 into engagement with the forward end of the plunger 77 of the device 18. At substantially the same time as the plunger stem 60 engages the plunger 77, the piston operatively engages the forward end of the emergency main slide valve 43.

Since the piston 64 of the device 18 is maintained in its forward position by fluid supplied from the emergency reservoir 3, further rearward movement of the emergency piston 40 and rearward movement of the main and auxiliary slide valves 43 and 44, respectively, will now be yieldably resisted by the springs 70 and 71 acting through the medium of the follower plate 72, collar 78 and stem 77.

Now when the brake pipe pressure has been increased to a predetermined degree, say for instance to twenty-pounds, the emergency piston and slide valves will have been moved to approximately the position in which they are shown in Fig. 3 of the drawings. With the main slide valve 43 in this position, the port 107 establishes communication from the passage 66 to the emergency valve chamber 45 just prior to the piston uncovering the port in the choke plug 48, so that fluid under pressure is quickly vented from the piston chamber 65 to the valve chamber 45 which is at atmospheric pressure. Upon thus venting fluid from the chamber 65, the device 18 no longer acts to oppose the movement of the emergency piston and slide valves. With the resistance of the device 18 thus destroyed, fluid at brake pipe pressure, (around twenty pounds) in the emergency piston chamber 40, causes the piston and slide valves to quickly move past their normal position to their inner release or back-dump position against the opposing pressure of the spring 52 acting through the member 51. The emergency piston, as it is thus moved, shifts the several parts of the device 18 to their normal position as shown in Fig. 4.

Fluid under pressure which may leak past the emergency piston 41 from the piston chamber 40 to the valve chamber 45 before the slide valve 43 is shifted to its inner position, will escape to the atmosphere by way of passage 102, quick action piston chamber 101, leakage groove 104 around the quick action piston 98 and port 105 in the piston, chamber 103 and passage 99, thus preventing an increase in the pressure of fluid in the chamber 45 which would otherwise oppose the rearward movement of the emergency piston and slide valves.

With the various parts of the emergency valve device 16 in the inner release or back-dump position as shown in Fig. 4 of the drawings, the cavity 108 in the emergency main slide valve 43 connects the passage 117 to a passage 121 which is open, through passage 97, to the strainer chamber 85 and consequently to the brake pipe 4. With this communication established, fluid under pressure flows from the auxiliary reservoir 2 and brake cylinder 14 to the brake pipe, the flow of fluid from the brake cylinder to the passage 117 being by way of pipe and passage 116, past the open timing valve 119, timing valve chamber 120 and passage 118. The triple valve device 16 still being in application position, the flow of fluid from the auxiliary reservoir 2 to the passage 117 is by way of pipe and passage 25, valve chamber 24 in the triple valve device, service port 112 in the main slide valve 22 and passages 113 and 118. This back-dump action effects several desirable results; first, it serves to save fluid under pressure which would otherwise be lost to the atmosphere; second, it rapidly increases the brake pipe pressure, which increase acts to hasten the recharging of the equipment on a train after an emergency application of the brakes; and further, by reducing auxiliary reservoir pressure to a low degree, substantially to equalization with the brake pipe, it facilitates movement of the triple valve parts to effect a release of the brakes.

When, in releasing the brakes, the brake pipe pressure in chamber 89 on one side of the flexible diaphragm 88, of the release insuring valve device 6, exceeds the auxiliary reservoir pressure in diaphragm chamber 90 by about one and one-half pounds, said diaphragm will flex inwardly and cause the valve 92 to be unseated. The triple valve piston 20 and slide valves 22 and 23 are intended to operate from application position to release position when the brake pipe pressure in the piston chamber 19 exceeds the auxiliary reservoir pressure in the valve chamber 24 by about one and one quarter pounds, so that the main slide valve 22 will lap the passage 93 before the release insuring valve 92 is unseated. With the passage 93 lapped, fluid under pressure will not be released from the auxiliary reservoir, through the medium of the valve device 6. If, however, a greater pressure differential is required to move the triple valve piston to release position than is required to unseat the valve 92, the valve will be unseated before the triple valve piston moves from application position to release position, and since in the application position of the main slide valve 22, the passage 93 is open to the atmosphere through a cavity 123 in the main slide valve 22, a passage and pipe 124 and retaining valve device 106, fluid under pressure will flow from the triple valve chamber 24 and connected auxiliary reservoir 2 to the passage 93 by way of passage 91, chamber 90, past the unseated valve 92 and then to the atmosphere, there being a choke 125 provided for retarding the flow of fluid through the passage 93.

On cars where the rate of increase in brake pipe pressure is slow, the triple valve parts have a tendency to be slow in their movement from application toward release position and in some cases may have a tendency to remain in application position. However, with the valve 92 unseated, these objectionable tendencies will be eliminated, for fluid under pressure will be vented from the auxiliary reservoir 2 to the atmosphere until a sufficient pressure differential is created on the triple valve piston 20 to cause it to move the main slide valve 22 promptly toward release position and into lapping relation with the passage 93.

With the triple valve parts in release position, the cavity 123 in the main slide valve 22 connects the brake cylinder passage 113 to passage 124 leading to the atmosphere, and fluid flows through this communication from the brake cylinder, so that the brakes are released.

Assuming now that each of the first fifty cars of a train of one hundred and fifty cars is equipped with my improved apparatus, each of the next fifty cars with the present standard fluid pressure brake equipment in which the K type of triple valve device is employed, and each of the last fifty cars with my improved apparatus, the release of the brakes, after an emergency application, is accomplished in the following manner.

At the front end of the train, in initiating the release of the brakes, the rise in brake pipe pressure is naturally at a fast rate, so that the emergency valve devices on the first fifty cars of the train will operate to quickly overcome the opposition offered by the devices 18 with the result that the emergency valve devices move serially to their inner or back-dump position without any material delay. On the last fifty cars of the train, where the rise in brake pipe pressure is at a slow rate, the devices 18 oppose movement of the several parts of the emergency valve devices toward their normal positions until the brake pipe pressure has been increased to a predetermined degree, for example to about twenty pounds, after which the devices 18 are rendered ineffective to oppose such movement. When the devices 18 are thus rendered ineffective, the brake pipe pressure in the emergency piston chambers 40 causes the emergency pistons and the emergency slide valves to quickly move past their normal release position to back-dump position in which fluid under pressure flows from the brake cylinders and auxiliary reservoirs to the brake pipe. It will thus be seen that the movement of the emergency valve devices to their back-dump position on the rear cars of the train will be insured regardless of the rate of increase in brake pipe pressure.

While I have assumed one train combination to show how my improved fluid pressure brake equipments on the rear cars of a train function to facilitate the release of the brakes after an emergency application, it will be understood that my equipment will function in the same manner anywhere in the train to insure the back-dump of fluid under pressure from the brake cylinder and auxiliary reservoir to the brake pipe.

In Fig. 5 of the drawings a modified form of the device 18 is illustrated which is adapted to function in substantially the same manner as the form of the device shown in Figs. 1 to 4 inclusive. In this modified form a piston 145 is provided having an open ended recess 126 containing a follower 127 carrying a plunger 128 which is adapted to engage with the plug 58 carried by the rear end portion of the emergency piston stem 42. Interposed between and engaging the piston and the follower, is a coil spring 129 which is the equivalent of the springs 70 and 71 of the device shown in Figs. 1 to 4 inclusive, outward movement of the follower being limited by a stop 130 carried by the piston, with which stop the follower is adapted to engage.

In Fig. 6 of the drawings another modified form of the device 18 is illustrated which is adapted to function in a slightly different manner than does either of the devices 18 shown in Figs. 1 to 4 inclusive and Fig. 5. In this modified form of the device a piston 131 is provided having a plunger 132 which is adapted to engage with the plug 58 carried by the rear end of the emergency piston stem 42. This piston is of such a diameter that when subjected to the equalized pressures of the emergency reservoir, auxiliary reservoir and brake cylinder (about sixty pounds) when an emergency application of the brakes is effected, it will oppose the movement of the several parts of the emergency valve device toward release position until such time as the brake pipe pressure has been increased to a predetermined degree, say for instance to twenty pounds, when it is rendered ineffective to oppose such movement. Interposed between and engaging the piston and the emergency valve casing is a spring 133 which is for the sole purpose of normally maintaining the piston and its plunger in their innermost position as shown.

It will here be noted that in either of the first two described forms of the device 18 the rearward movement of the emergency piston and slide valves is opposed by spring pressure, so that regardless of whether the pressure of fluid in the piston chamber 65 is sixty pounds or higher, the device will be rendered ineffective to oppose such movement when the brake pipe pressure has been increased to twenty pounds. In the form of the device last described and shown in Fig. 6, the movement of the emergency piston and slide valves is opposed by the pressure of fluid in the piston chamber 65 acting through the medium of the piston 131, which is made of such a size that when the brake pipe pressure in the emergency piston chamber 40 has been increased to twenty pounds, the resistance piston 131 will have been overcome sufficiently to permit the emergency main slide valve to establish the communication through which fluid under pressure is vented from the chamber 65. If the pressure of fluid in the chamber 65 is higher than sixty pounds, which would be the case if the equipment is normally charged to ninety pounds instead of seventy, the brake pipe pressure would have to be increased to over twenty pounds before the device could be rendered ineffective. In an equipment where the pressure of fluid in the chamber 65 would exceed sixty pounds, I prefer to provide a piston of less diameter than the piston which would be employed in an equipment where the pressure of fluid in the chamber 65 was sixty pounds or less, so that when the brake pipe pressure in chamber 40 has been increased to twenty pounds, the device would be rendered ineffective.

In the foregoing description, the devices 18 have been described as being for the purpose of insuring the back-dump action of the emergency valve device in effecting the release of the brakes after an emergency application, but it will be seen from the following description that it also functions to prevent the emergency valve parts from being accidentally moved to either their normal position or their inner or back-dump position when an emergency application of the brakes is being effected.

In the new type of brake equipment such as is disclosed in the aforementioned Farmer application and in my present application, the quick action valve device 9 is timed to remain open for approximately one minute after an emergency application of the brakes is initiated, so as to completely vent the brake pipe. Where each car of a train is equipped with the new apparatus and in some combinations of the new and old apparatus, the brake pipe will be completely vented within this period of time. I have found that, in numerous other combinations of new and old apparatus, fluid under pressure in the brake pipe on cars equipped with the old brake apparatus, may not be completely released during the period of time that the vent valve devices of the new apparatus remain open, with the result that when the vent valves are closed, fluid under pressure which may be in the brake pipe of the cars equipped with the old apparatus will flow to the brake pipe on the cars equipped with the new apparatus and increase the brake pipe pressure on these cars. In some cases this increase in brake pipe pressure on the cars equipped with the new apparatus may be at such a rapid rate as to cause the parts of the emergency valve devices to move to their inner or back-dump position in which the emergency reservoirs are closed off from the brake cylinders and fluid under pressure flows from the brake cylinders and auxiliary reservoirs to the brake pipe. This is of course very objectionable for the reason that it materially decreases the brake cylinder pressure.

With the devices 18 so constructed that they will oppose the movement of the several parts of the emergency valve devices toward their inner or back-dump position until such time as the brake pipe pressure has been increased to around twenty pounds, the accidental and undesirable operation of the emergency valve devices to back-dump position, in effecting an emergency application of the brakes, will be entirely eliminated since the increase in brake pipe pressure due to the flow of fluid from the brake pipe on the cars equipped with the old apparatus to the brake pipe on the cars equipped with the new apparatus, will not equal twenty pounds.

In Fig. 7 a further modification of the device 18 is illustrated in which there is a choke plug 134 interposed in the passage 66 leading from the piston chamber 65 to the seat of the emergency main slide valve 43 and in which there is a by-pass passage 135 around the choke plug 134. A ball check valve 136 is interposed in the passage 135. When an emergency application of the brakes is being effected, fluid under pressure supplied to the passage 66 flows to the piston chamber 65 by way of the passage in the choke plug 134 and also by way of the by-pass passage 135. When in releasing an emergency application of the brakes the emergency main slide valve 43 is moved by the emergency piston 41 to the position in which it is shown in Fig. 3, fluid under pressure is vented from the piston chamber 65 by way of the passage in the choke plug 134, the check valve 136 preventing the flow of fluid from the chamber 65 by way of the passage 135. The flow area of the passage in the choke plug 134 is such that the flow of fluid from the chamber 65 will be slightly slower than in the other forms of the device 18 hereinbefore described. This feature tends to reduce the momentum of the piston 65 in its movement toward normal position and thus tends to reduce the force of impact of the piston against the casing. If desired, this feature may be embodied in any of the devices 18 heretofore described.

It is to be understood that when practically all of the old type fluid pressure brake equipments have been replaced by the new type of equipment or have been reconstructed to have the operating characteristics of the new equipment, the devices 18 may be removed if so desired. When this is done, the opening which is defined by the annular rib 53 of the emergency valve cap 49 and the passages 66 and 68 will be closed by a suitable blanking plate which may be secured to the cap 49.

In the foregoing description, I have for the sake of clarity, assumed that there is substantially no leakage of fluid under pressure from the brake pipe. I am, however, aware of the fact that such a condition is difficult to maintain and that leakage from the brake pipe may occur and may be such that at the rear end of the train the brake equipments will be charged to a somewhat lower pressure than the equipment at the head end of the train. It is to be understood that when such a pressure gradient exists, the brake equipments will function in substantially the same manner as described.

From the foregoing description it will be seen that I have provided a device 18 which will function, when an emergency application of the brakes is being effected, to prevent the emergency valve device from being unintentionally operated from its brake applying position by an increase in brake pipe pressure which may be caused by the flow of fluid from the brake pipe of the old type equipment to the brake pipe of the new, and which will function, in effecting the release of an emergency application, to insure the movement of the emergency valve device to its inner or back-dump position regardless of the rate of increase in brake pipe pressure.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid pressure brake, the combination with a brake pipe, of a valve device having a release position and operative upon an emergency reduction in brake pipe pressure for initiating an emergency operation, and means for opposing movement of said valve device to release position upon an increase in brake pipe pressure after an emergency reduction in brake pipe pressure until the brake pipe pressure has been increased to a predetermined degree.

2. In a fluid pressure brake, the combination with a brake pipe and a brake cylinder, of a valve mechanism operated upon a reduction in brake pipe pressure to a brake applying position in which fluid under pressure is supplied to the brake cylinder and operated upon an increase in brake pipe pressure to a brake releasing position in which fluid under pressure is vented from the brake cylinder, and means positioned upon effecting an application of the brakes to engage with said valve mechanism to maintain the valve mechanism out of brake releasing position until the brake pipe pressure has been increased to a predetermined degree.

3. In a fluid pressure brake, the combination with a brake pipe and a brake cylinder, of a valve mechanism operated upon a reduction in brake pipe pressure to a brake applying position in which fluid under pressure is supplied to the brake cylinder and operated upon an increase in brake pipe pressure to a brake releasing position in which fluid under pressure is vented from the brake cylinder, and a movable abutment positioned upon effecting an application of the brakes to engage with said valve mechanism to maintain the valve mechanism out of brake releasing position until the brake pipe pressure has been increased to a predetermined degree.

4. In a fluid pressure brake, the combination with a brake pipe and a brake cylinder, of a valve mechanism operated upon a reduction in brake pipe pressure to a brake applying position in which fluid under pressure is supplied to the brake cylinder and operated upon an increase in brake pipe pressure to a brake releasing position in which fluid under pressure is vented from the brake cylinder, and means positioned upon effecting an application of the brakes to engage with said valve mechanism to maintain the valve mechanism out of brake releasing position until the brake pipe pressure has been increased to a predetermined degree, said means comprising a movable abutment and means carried thereby for engagement with said valve mechanism.

5. In a fluid pressure brake, the combination with a brake pipe and a brake cylinder, of a valve mechanism operated upon a reduction in brake pipe pressure to a brake applying position in which fluid under pressure is supplied to the brake cylinder and operated upon an increase in brake pipe pressure to a brake releasing position in which fluid under pressure is vented from the brake cylinder, and means positioned upon effecting an application of the brakes to engage with said valve mechanism to maintain the valve mechanism out of brake releasing position until the brake pipe pressure has been increased to a predetermined degree, said means comprising a movable abutment and yieldable means cooperating with the abutment and said valve mechanism for opposing movement of the valve mechanism toward brake releasing position.

6. In a fluid pressure brake, the combination with a brake pipe and a brake cylinder, of a valve mechanism operated upon a reduction in brake pipe pressure to a brake applying position in which fluid under pressure is supplied to the brake cylinder and operated upon an increase in brake pipe pressure to a brake releasing position in which fluid under pressure is vented from the brake cylinder, means positioned upon effecting an application of the brakes to engage with said valve mechanism to maintain the valve mechanism out of brake releasing position, and means for rendering the positioned means ineffective to maintain the valve mechanism out of brake releasing position upon a predetermined increase in brake pipe pressure.

7. In a fluid pressure brake, the combination with a brake pipe and a brake cylinder, of a valve mechanism operated upon a reduction in brake pipe pressure to a brake applying position in which fluid under pressure is supplied to the brake cylinder and operated upon an increase in brake pipe pressure to a brake releasing position in which fluid under pressure is vented from the brake cylinder, means positioned by fluid under pressure upon effecting an application of the brakes to engage with said valve mechanism to maintain the valve mechanism out of brake releasing position, and means for venting the fluid under pressure from the first mentioned means upon a predetermined increase in brake pipe pressure for rendering the first mentioned means ineffective to maintain the valve mechanism out of brake releasing position.

8. In a fluid pressure brake, the combination with a brake pipe and a brake cylinder, of a valve device comprising a piston subject to brake pipe pressure and a valve operated by said piston upon a reduction in brake pipe pressure for supplying fluid under pressure to the brake cylinder and operated by said piston upon an increase in brake pipe pressure for venting fluid under pressure from the brake cylinder, and means positioned upon effecting an application of the brakes to engage with said piston for maintaining said valve out of brake cylinder venting position until the brake pipe pressure has been increased to a predetermined degree.

9. In a fluid pressure brake, the combination with a brake pipe, a brake cylinder and valve mechanism operated upon a sudden reduction in brake pipe pressure for supplying fluid under pressure to the brake cylinder, of means included in said valve mechanism movable upon an increase in brake pipe pressure after the sudden reduction in brake pipe pressure for supplying fluid under pressure to the brake pipe, means for opposing the movement of the first mentioned means until the brake pipe pressure has been increased to a predetermined degree, and means for rendering the second mentioned means ineffective to oppose the movement of the first mentioned means when the brake pipe pressure is increased to said predetermined degree.

10. In a fluid pressure brake, the combination with a brake pipe, a brake cylinder and valve mechanism operated upon a sudden reduction in brake pipe pressure for supplying fluid under pressure to the brake cylinder, of means included in said valve mechanism movable upon an increase in brake pipe pressure after the sudden reduction in brake pipe pressure for supplying fluid under pressure to the brake pipe, and fluid pressure controlled means opposing the movement of the first mentioned means until the brake pipe pressure has been increased to a predetermined degree.

11. In a fluid pressure brake, the combination with a brake pipe, a brake cylinder and valve mechanism operated upon a sudden reduction in brake pipe pressure for supplying fluid under pressure to the brake cylinder, of means included in said valve mechanism movable upon an increase in brake pipe pressure after the sudden reduction in brake pipe pressure for supplying fluid under pressure to the brake pipe, and means for opposing the movement of the first mentioned means only until the brake pipe pressure has been increased to a predetermined degree.

12. In a fluid pressure brake, the combination with a brake pipe, a brake cylinder and valve mechanism operated upon a sudden reduction in brake pipe pressure for supplying fluid under pressure to the brake cylinder, of means included in said valve mechanism movable upon an increase in brake pipe pressure after the sudden reduction in brake pipe pressure for supplying fluid under pressure to the brake pipe, and means positioned, when the valve mechanism is operated upon a sudden reduction in brake pipe pressure, for temporarily opposing the movement of the first mentioned means upon an increase in brake pipe pressure.

13. In a fluid pressure brake, the combination with a brake pipe, a brake cylinder and valve mechanism operated upon a sudden reduction in brake pipe pressure for supplying fluid under pressure to the brake cylinder, of means included in said valve mechanism movable upon an increase in brake pipe pressure after the sudden reduction in brake pipe pressure for supplying fluid under pressure to the brake pipe, and means positioned, when the valve mechanism is operated upon a sudden reduction in brake pipe pressure, for yieldably opposing the movement of the first mentioned means until the brake pipe pressure has been increased to a predetermined degree.

14. In a fluid pressure brake, the combination with a brake pipe, a brake cylinder and valve mechanism operated upon a sudden reduction in brake pipe pressure for supplying fluid under pressure to the brake cylinder, of means included in said valve mechanism movable upon an increase in brake pipe pressure after the sudden reduction in brake pipe pressure for supplying fluid under pressure to the brake pipe, means positioned, when the valve mechanism is operated upon a sudden reduction in brake pipe pressure, for opposing the movement of the first mentioned means upon an increase in brake pipe pressure, and means for rendering the positioned means ineffective to oppose the movement of the first mentioned means when the brake pipe pressure is increased to a predetermined degree.

15. In a fluid pressure brake, the combination with a brake pipe, of a valve mechanism having a normal position, a brake applying position and an inner brake releasing position and operated from said normal position to the brake applying position upon a sudden reduction in brake pipe pressure and operated toward said normal and inner release position upon an increase in brake pipe pressure, and means opposing the movement of the valve mechanism toward said normal position until the brake pipe pressure is increased sufficiently to insure the mechanism moving beyond the normal position to the inner brake releasing position.

16. In a fluid pressure brake, the combination with a brake pipe, of a valve mechanism having a normal position, a brake applying position and an inner brake releasing position and operated from said normal position to the brake applying position upon a sudden reduction in brake pipe pressure and operated toward said normal and inner release position upon an increase in brake pipe pressure, means opposing the movement of the valve mechanism toward the normal position, and means for rendering the opposing means ineffective to oppose the movement of the valve mechanism toward the normal and inner release positions when the brake pipe pressure has been increased sufficiently to insure the valve mechanism moving beyond the normal position to the inner release position.

17. In a fluid pressure brake, the combination with a brake pipe, of a valve mechanism having a normal position, a brake applying position and an inner brake releasing position and operated from said normal position to the brake applying position upon a sudden reduction in brake pipe pressure and operated toward said normal and inner release position upon an increase in brake pipe pressure, means adapted to oppose movement of the valve mechanism from the normal position toward the inner position, means opposing movement of the valve mechanism toward the normal position, and means for rendering the second mentioned opposing means ineffective to oppose the movement of the valve mechanism when the brake pipe pressure has been increased sufficiently to insure the valve mechanism moving to the inner position against the resistance offered by the first mentioned opposing means.

18. In a fluid pressure brake, the combination with a brake pipe and a brake cylinder, of an emergency valve mechanism having a normal position and an inner position in which the brake cylinder is connected to the brake pipe and operated upon a sudden reduction in brake pipe pressure to an emergency position for supplying fluid under pressure to the brake cylinder, said emergency valve mechanism being movable to its inner position upon an increase in brake pipe pressure after a sudden reduction in brake pipe pressure, and means for opposing the movement of the emergency valve mechanism toward the normal position until the brake pipe pressure has been increased sufficiently to insure the valve mechanism moving through the normal position to the inner position.

19. In a fluid pressure brake, the combination with a brake pipe and a brake cylinder, of an emergency valve mechanism having a normal position and an inner position in which the brake cylinder is connected to the brake pipe and operated upon a sudden reduction in brake pipe pressure to an emergency position for supplying fluid under pressure to the brake cylinder, said emergency valve mechanism being movable to its inner position upon an increase in brake pipe pressure after a sudden reduction in brake pipe pressure, and means positioned when said emergency valve mechanism is in emergency position for opposing movement of the emergency valve mechanism toward the normal release position.

20. In a fluid pressure brake, the combination with a brake pipe and a brake cylinder, of an emergency valve mechanism having a normal position and an inner position in which the brake cylinder is connected to the brake pipe and operated upon a sudden reduction in brake pipe pressure to an emergency position for supplying fluid under pressure to the brake cylinder, said emergency valve mechanism being movable to its inner position upon an increase in brake pipe pressure after a sudden reduction in brake pipe pressure, and means opposing movement of the emergency valve mechanism from emergency position toward the normal position.

21. In a fluid pressure brake, the combination with a brake pipe and a brake cylinder, of an emergency valve mechanism having a normal position and an inner position in which the brake cylinder is connected to the brake pipe and operated upon a sudden reduction in brake pipe pressure to an emergency position for supplying fluid under pressure to the brake cylinder, said emergency valve mechanism being movable to its inner position upon an increase in brake pipe pressure after a sudden reduction in brake pipe pressure, means opposing movement of the emergency valve mechanism toward the normal position until the brake pipe pressure has been increased to a degree sufficient to insure the movement of the emergency valve mechanism through the normal position to the inner position, and means for urging the emergency valve mechanism from the inner position to the normal position.

22. In a fluid pressure brake, the combination with a brake pipe and a brake cylinder, of an emergency valve mechanism having a normal position and an inner position in which the brake cylinder is connected to the brake pipe and operated upon a sudden reduction in brake pipe pressure to an emergency position for supplying fluid under pressure to the brake cylinder, said emergency valve mechanism being movable to its inner position upon an increase in brake pipe pressure after a sudden reduction in brake pipe pressure, and means positioned by fluid under pressure when the emergency valve mechanism is moved toward emergency position for opposing movement of the mechanism from emergency position toward the normal position.

23. In a fluid pressure brake, the combination with a brake pipe and a brake cylinder, of an emergency valve mechanism having a normal position and an inner position in which the brake cylinder is connected to the brake pipe and operated upon a sudden reduction in brake pipe pressure to an emergency position for supplying fluid under pressure to the brake cylinder, said emergency valve mechanism being movable to its inner position upon an increase in brake pipe pressure after a sudden reduction in brake pipe pressure, means subject to fluid under pressure when the emergency valve mechanism is in emergency position for opposing movement of the valve mechanism from emergency position toward the normal position, and means for releasing the fluid under pressure, to which the opposing means is subjected, before the emergency valve mechanism is moved to the normal position upon an increase in brake pipe pressure.

24. In a fluid pressure brake, the combination with a brake pipe and a brake cylinder, of an emergency valve mechanism having a normal position and an inner position in which the brake cylinder is connected to the brake pipe and operated upon a sudden reduction in brake pipe pressure to an emergency position for supplying fluid under pressure to the brake cylinder, said emergency valve mechanism being movable to its inner position upon an increase in brake pipe pressure after a sudden reduction in brake pipe pressure, means subject to fluid under pressure when the emergency valve mechanism is in emergency position for opposing movement of the valve mechanism from emergency position toward the normal position, and means operated upon a predetermined increase in brake pipe pressure for venting fluid under pressure to which the opposing means is subjected for rendering the opposing means ineffective to oppose the movement of the emergency valve mechanism to the inner position.

25. In a fluid pressure brake, the combination with a brake pipe and a brake cylinder, of a brake controlling valve device operated upon a sudden reduction in brake pipe pressure for supplying fluid under pressure to the brake cylinder, said brake controlling valve device being designed to be operated upon a predetermined increase in brake pipe pressure at a predetermined rate after a sudden reduction in brake pipe pressure for supplying fluid under pressure from the brake cylinder to the brake pipe, and means adapted, when associated with said valve device, to operatively engage and thereby condition the valve device to operate upon a predetermined increase in brake pipe pressure independently of the rate, for supplying fluid under pressure from the brake cylinder to the brake pipe.

26. In a fluid pressure brake, the combination with a brake pipe and a brake cylinder, of a brake controlling valve device operated upon a sudden reduction in brake pipe pressure for supplying fluid under pressure to the brake cylinder, said brake controlling valve device being designed to be operated upon a predetermined increase in brake pipe pressure at a predetermined rate after a sudden reduction in brake pipe pressure for supplying fluid under pressure from the brake cylinder to the brake pipe, and means applicable to said brake controlling valve device and adapted to operatively engage the device when associated therewith for modifying the operating characteristics of the brake controlling device so as to operate to supply fluid from the brake cylinder to the brake pipe upon a predetermined increase in brake pipe pressure without regard to rate.

27. In a fluid pressure brake, the combination with a brake pipe and a brake cylinder, of a brake controlling valve device operated upon a sudden reduction in brake pipe pressure for supplying fluid under pressure to the brake cylinder, said brake controlling valve device being designed to be operated upon a predetermined increase in brake pipe pressure at a predetermined rate after a sudden reduction in brake pipe pressure for supplying fluid under pressure from the brake cylinder to the brake pipe, and means adapted when associated with the valve device, to be controlled by the valve device for conditioning the valve device to operate, upon a predetermined increase in brake pipe pressure independently of the rate of increase, to supply fluid under pressure from the brake cylinder to the brake pipe.

28. In a fluid pressure brake, the combination with a brake pipe and a brake cylinder, of a brake controlling valve device operated upon a sudden reduction in brake pipe pressure for supplying fluid under pressure to the brake cylinder, said brake controlling valve device being designed to be operated upon a predetermined increase in brake pipe pressure at a predetermined rate after a sudden reduction in brake pipe pressure for supplying fluid under pressure from the brake cylinder to the brake pipe, and fluid pressure responsive means adapted, when associated with the valve device, to be controlled by said valve device for conditioning the valve device to operate, upon a predetermined increase in brake pipe pressure independently of the rate of increase, to supply fluid under pressure from the brake cylinder to the brake pipe.

29. In a fluid pressure brake, the combination with a brake pipe, a brake cylinder and an emergency valve device comprising a piston subject to brake pipe pressure and a valve operated by said piston upon a sudden reduction in brake pipe pressure for supplying fluid under pressure to the brake cylinder and operated by said piston upon an increase in brake pipe pressure for venting fluid under pressure from the brake cylinder to the brake pipe, of means subject to fluid under pressure opposing movement of said piston and valve to the brake cylinder venting position and rendered ineffective to oppose the movement of the piston and valve upon the venting of fluid under pressure therefrom, and means in said valve establishing a communication through which fluid under pressure is vented from the first mentioned means when the brake pipe pressure has been increased to a predetermined degree.

30. In a fluid pressure brake, the combination with a brake pipe, a brake cylinder and an emergency valve device comprising a piston subject to brake pipe pressure and a valve operated by said piston upon a sudden reduction in brake pipe pressure for supplying fluid under pressure to the brake cylinder and operated by said piston upon an increase in brake pipe pressure for venting fluid under pressure from the brake cylinder to the brake pipe, of means subject to fluid under pressure opposing movement of said piston and valve to the brake cylinder venting position and rendered ineffective to oppose the movement of the piston and valve upon the venting of fluid under pressure therefrom, and means in said valve establishing a communication through which fluid under pressure is vented from the first mentioned means before the slide valve is shifted to the brake cylinder venting position.

31. In a fluid pressure brake, the combination with a brake pipe, a brake cylinder and an emergency valve device comprising a piston subject to brake pipe pressure and a valve operated by said piston upon a sudden reduction in brake pipe pressure for supplying fluid under pressure to the brake cylinder and operated by said piston upon an increase in brake pipe pressure for venting fluid under pressure from the brake cylinder to the brake pipe, of means subject to fluid under pressure opposing movement of said piston and valve to the brake cylinder venting position and rendered ineffective to oppose the movement of the piston and valve upon the venting of fluid under pressure therefrom, means in said valve for establishing a communication through which fluid under pressure is supplied to the opposing means when the valve is moved to the position in which fluid is supplied to the brake cylinder, and means in said valve for establishing a communication through which fluid under pressure is vented from said opposing means when the brake pipe pressure has been increased to a predetermined degree.

32. In a fluid pressure brake, the combination with a brake pipe, a brake cylinder and an emergency valve device comprising a piston subject to brake pipe pressure and a valve operated by said piston upon a sudden reduction in brake pipe pressure for supplying fluid under pressure to the brake cylinder and operated by said piston upon an increase in brake pipe pressure for venting fluid under pressure from the brake cylinder to the brake pipe, of means for opposing movement of said piston and valve to the brake cylinder venting position until the brake pipe pressure is increased to a predetermined degree, said means comprising an abutment movable into opposing position with relation to said piston and valve upon an increase in fluid pressure on one side of the abutment and rendered ineffective to oppose the movement of the piston and valve to brake cylinder venting position upon the venting of fluid from said side of the abutment, and means included in said slide valve for controlling the supply of fluid to and the release of fluid from said side of the abutment.

33. In a fluid pressure brake, the combination with a brake pipe, a brake cylinder, an emergency reservoir normally charged with fluid under pressure, a quick action chamber normally charged with fluid under pressure and an emergency valve device comprising a piston subject to the opposing pressures of the brake pipe and quick action chamber and a valve operated by said piston upon a sudden reduction in brake pipe pressure for supplying fluid under pressure to the brake cylinder and for venting fluid under pressure from the quick action chamber and operated by said piston upon an increase in brake pipe pressure for venting fluid under pressure from the brake cylinder to the brake pipe, of means for opposing movement of the piston and valve to their brake cylinder venting position, said means comprising an abutment normally subject on opposite sides to fluid at quick action chamber pressure and operable upon the reduction in quick action chamber pressure on one side and an increase in the pressure on the other side to a position to oppose the movement of the piston and slide valve toward their brake cylinder venting position, said abutment being rendered ineffective to oppose such movement upon the reduction of the pressure on said other side of the abutment, means in said valve for establishing a communication through which fluid under pressure is supplied from the emergency reservoir to said other side of the abutment when the valve is shifted to the position to supply fluid to the brake cylinder, and means in said valve for venting fluid under pressure from said other side of the abutment when the brake pipe pressure has been increased to a predetermined degree.

34. In a fluid pressure brake, the combination with a brake pipe, of an emergency valve device comprising a movable abutment and valve means having a release position and operative upon an emergency reduction in brake pipe pressure for initiating an emergency operation, said movable abutment and valve means being moved to release position upon a predetermined rate of increase in brake pipe pressure initiated after an emergency reduction in brake pipe pressure, and removable means associated with said valve device for opposing the movement of said movable abutment and valve means to release position until the brake pipe pressure has been increased regardless of rate to a predetermined degree.

35. In a fluid pressure brake, the combination with a brake pipe, auxiliary reservoir, brake cylinder and valve means operated upon a reduction in brake pipe pressure for supplying fluid under pressure from the auxiliary reservoir to the brake cylinder, of means operated upon an increase in brake pipe pressure to a predetermined degree and regardless of the rate of increase after an emergency reduction in brake pipe pressure for reducing the pressure of fluid in the auxiliary reservoir, and means operated upon an increase in brake pipe pressure to a predetermined degree in excess of auxiliary reservoir pressure for also reducing the pressure of fluid in the auxiliary reservoir.

36. In a fluid pressure brake, the combination with a brake pipe, auxiliary reservoir, brake cylinder and valve means operated upon a reduction in brake pipe pressure for supplying fluid under pressure from the auxiliary reservoir to the brake cylinder, of means operated upon an increase in brake pipe pressure to a predetermined degree and regardless of the rate of increase after an emergency reduction in brake pipe pressure for venting fluid under pressure from the auxiliary reservoir to the brake pipe, and means operated upon an increase in brake pipe pressure to a predetermined degree in excess of auxiliary reservoir pressure for venting fluid from the auxiliary reservoir to the atmosphere.

37. In a fluid pressure brake, the combination with a brake pipe and a brake cylinder, of a valve mechanism operated upon a reduction in brake pipe pressure to a brake applying position in which fluid under pressure is supplied to the brake cylinder and operated upon an increase in brake pipe pressure to a brake releasing position in which fluid under pressure is vented from the brake cylinder, means positioned by fluid under pressure upon effecting an application of the brakes to engage with said valve mechanism to maintain the valve mechanism out of brake releasing position, means for venting the fluid under pressure from the first mentioned means upon a predetermined increase in brake pipe pressure for rendering the first mentioned means ineffective to maintain the valve mechanism out of brake releasing position, and means restricting the flow of fluid from the first mentioned means.

38. In a fluid pressure brake, the combination with a brake pipe and a brake cylinder, of an emergency valve mechanism having a normal position and an inner position in which the brake cylinder is connected to the brake pipe and operated upon a sudden reduction in brake pipe pressure to an emergency position for supplying fluid under pressure to the brake cylinder, said emergency valve mechanism being movable to its inner position upon an increase in brake pipe pressure after a sudden reduction in brake pipe pressure, means subject to fluid under pressure when the emergency valve mechanism is in emergency position for opposing movement of the valve mechanism from emergency position toward the normal position, means for releasing the fluid under pressure, to which the opposing means is subjected, before the emergency valve mechanism is moved to the normal position upon an increase in brake pipe pressure, and means restricting the flow of fluid from the opposing means.

39. In a fluid pressure brake, the combination with a brake pipe and a brake cylinder, of a valve mechanism operated upon a reduction in brake pipe pressure to a brake applying position in which fluid under pressure is supplied to the brake cylinder and operated upon an increase in brake pipe pressure to a brake releasing position in which fluid under pressure is vented from the brake cylinder, means positioned by fluid under pressure upon effecting an application of the brakes to engage with said valve mechanism to maintain the valve mechanism out of brake releasing position, and means for venting fluid under pressure from the first mentioned means upon a predetermined increase in brake pipe pressure for causing the first mentioned means to be moved in a direction away from the valve mechanism, and means restricting the flow of fluid from the first mentioned means to cushion the action of the first mentioned means in its traverse away from the valve mechanism.

40. In a fluid pressure brake, the combination with a brake pipe and a brake cylinder, of a valve mechanism operated upon a reduction in brake pipe pressure to a brake applying position in which fluid under pressure is supplied to the brake cylinder and operated upon an increase in brake pipe pressure to a brake releasing position in which fluid under pressure is vented from the brake cylinder, means positioned by fluid under pressure upon effecting an application of the brakes to engage with said valve mechanism to maintain the valve mechanism out of brake releasing position, means for venting fluid under pressure from the first mentioned means upon a predetermined increase in brake pipe pressure for causing the first mentioned means to be moved in a direction away from the valve mechanism, means for restricting the flow of fluid from the first mentioned means to cushion the action of the first mentioned means in its traverse away from the valve mechanism, a passage by-passing the second mentioned means, fluid under pressure being adapted to be supplied to the first mentioned means through both the passage and second mentioned means, and means preventing back flow of fluid from the first mentioned means through said passage.

41. In a fluid pressure brake, the combination with a brake pipe and a brake cylinder, of an emergency valve mechanism operated upon an emergency reduction in brake pipe pressure to a brake applying position in which fluid under pressure is supplied to the brake cylinder and operated upon an increase in brake pipe pressure in releasing the brakes for supplying fluid under pressure to the brake pipe, and means positioned upon movement of the emergency valve mechanism to brake applying position to oppose movement of the emergency valve mechanism toward the position in which it supplies fluid under pressure to the brake pipe.

42. In a fluid pressure brake, the combination with a brake pipe and a brake cylinder, of an emergency valve mechanism operated upon an emergency reduction in brake pipe pressure to a brake applying position in which fluid under pressure is supplied to the brake cylinder and operated upon an increase in brake pipe pressure in releasing the brakes for supplying fluid under pressure to the brake pipe, and means positioned by fluid under pressure upon movement of the emergency valve mechanism to brake applying position to oppose movement of the emergency valve mechanism toward the position in which it supplies fluid under pressure to the brake pipe.

43. In a fluid pressure brake, the combination with a brake pipe and a brake cylinder, of an emergency valve mechanism operated upon an emergency reduction in brake pipe pressure to a brake applying position in which fluid under pressure is supplied to the brake cylinder and operated upon an increase in brake pipe pressure in releasing the brakes for supplying fluid under pressure to the brake pipe, and spring means positioned by fluid under pressure upon movement of the emergency valve mechanism to brake applying position to oppose movement of the emergency valve mechanism toward the position in which it supplies fluid to the brake pipe.

44. In a fluid pressure brake, the combination with a brake pipe and a brake cylinder, of an emergency valve mechanism operated upon an emergency reduction in brake pipe pressure to a brake applying position in which fluid under pressure is supplied to the brake cylinder and operated upon an increase in brake pipe pressure in releasing the brakes for supplying fluid under pressure to the brake pipe, and means operative upon effecting an emergency application of the brakes to provide a pressure which opposes movement of the emergency valve mechanism toward the position in which it supplies fluid under pressure to the brake pipe.

45. In a fluid pressure brake, the combination with a brake pipe and a brake cylinder, of an emergency valve mechanism operated upon an emergency reduction in brake pipe pressure to a brake applying position in which fluid under pressure is supplied to the brake cylinder and operated upon an increase in brake pipe pressure in releasing the brakes for venting fluid under pressure from the brake cylinder to the brake pipe, and means operative upon effecting an emergency application of the brakes to provide a pressure which opposes movement of the emergency valve mechanism toward venting position.

ELLIS E. HEWITT.